Sept. 30, 1952 S. E. CAPELL 2,612,053
PLURAL-SPEED FRICTION DRIVE MECHANISM
Filed Dec. 6, 1949 6 Sheets-Sheet 1

INVENTOR.
Sidney E. Capell
BY Slough & Slough
His Attorneys

Sept. 30, 1952  S. E. CAPELL  2,612,053
PLURAL-SPEED FRICTION DRIVE MECHANISM
Filed Dec. 6, 1949  6 Sheets-Sheet 2

INVENTOR.
Sidney E. Capell
BY Slough & Slough,
His Attorneys.

Sept. 30, 1952          S. E. CAPELL          2,612,053

PLURAL-SPEED FRICTION DRIVE MECHANISM

Filed Dec. 6, 1949          6 Sheets—Sheet 3

INVENTOR.
Sidney E. Capell.
BY Slough & Slough,
His Attorneys.

Sept. 30, 1952 S. E. CAPELL 2,612,053
PLURAL-SPEED FRICTION DRIVE MECHANISM
Filed Dec. 6, 1949 6 Sheets-Sheet 5

INVENTOR.
Sidney E. Capell.
BY Slough & Slough,
His Attorneys.

Sept. 30, 1952 S. E. CAPELL 2,612,053
PLURAL-SPEED FRICTION DRIVE MECHANISM
Filed Dec. 6, 1949 6 Sheets-Sheet 6
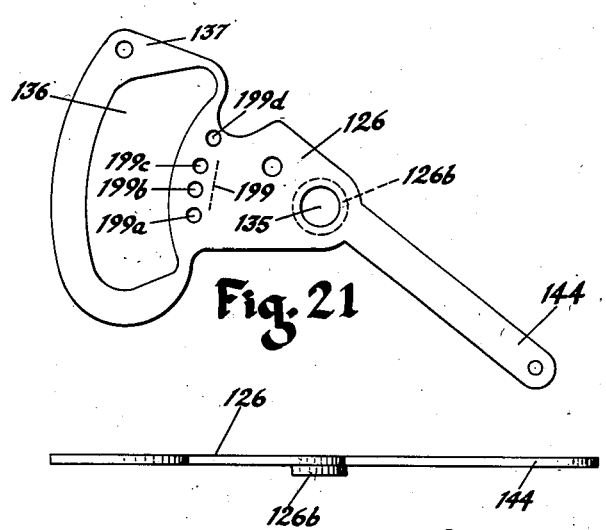
Fig. 21
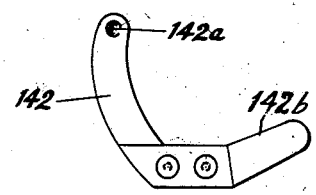
Fig. 23
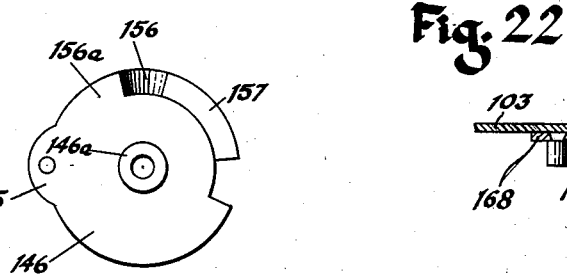
Fig. 22
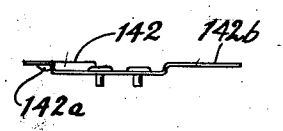
Fig. 24
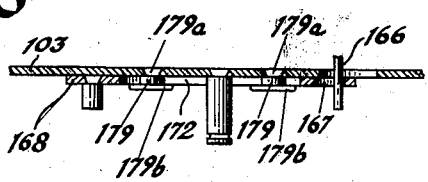
Fig. 25
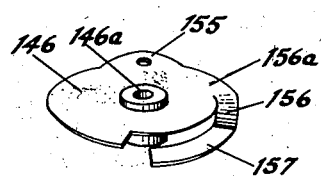
Fig. 27
Fig. 26
INVENTOR.
Sidney E. Capell,
BY George & Hough,
His Attorneys Patented Sept. 30, 1952

2,612,053

UNITED STATES PATENT OFFICE 2,612,053

PLURAL-SPEED FRICTION DRIVE MECHANISM

Sidney E. Capell, Elyria, Ohio, assignor to The General Industries Company, Elyria, Ohio, a corporation of Ohio Application December 6, 1949, Serial No. 131,330

11 Claims. (Cl. 74—199)

My invention relates to a plural speed friction drive mechanism for driving phonograph turntables at any selected one of a plurality of rotational speeds.

More particularly, my present invention relates to the driving of a final drive friction wheel which, in turn, is adapted to be peripherally frictionally engaged with an annular element of a phonograph turntable such as an annular pendant flange thereof in substantially the same manner as disclosed in the prior patent granted to Herbert L. Hartman, No. 2,421,910, on June 10, 1947.

With respect to the improved means herein disclosed for selectively driving the idler wheel at three different speeds, my invention in some aspects, represents improvements over the mechanism of the pending application of Herbert L. Hartman, Serial No. 22,348 filed April 21, 1948, and of Patent No. 2,438,265 to Metzner, dated March 23, 1948.

Objects of my invention include the following:

To provide an improved plural speed friction drive mechanism adapted to effect rotation of a final drive wheel of the mechanism, at any of at least three different rotational speeds, the rim of said wheel being adapted for disposition in horizontal alignment with, and being adapted for frictional driving engagement with such an annular element of a turntable as a pendant peripheral flange thereof, whereby said turntable may be selectively driven by said wheel at any of a plurality of different rotational speeds.

To achieve the driving of such friction wheel at a plurality of speeds in an improved manner including the selective engagement of the said wheel with either of two pulley portions of a first motor driven pulley, which portions are of different diameters and are disposed at different levels, and as an additional alternative, to effect peripheral engagement between said wheel and a portion of a second pulley which is driven by the motor shaft, and preferably by means of a belt encompassing another portion of the said first motor driven pulley and a portion of said second pulley.

To achieve any or all of the foregoing objects in an improved mechanism wherein the said wheel is resiliently constrained toward an operative position of engagement with any of the plurality of said pulley portions by which said wheel is adapted to be selectively driven.

To provide an improved plural-speed driving mechanism applicable to the driving by a final drive wheel thereof of a peripheral annular flange of a phonograph turntable, by vertically adjusting the idler wheel in an improved manner so as to effect engagement thereof by either of two co-axial upper or lower portions of a motor driven pulley which are of different diameters, or to shift said idler wheel laterally and at times, also vertically, to place it in engagement with a pulley element which is driven by said shaft and disposed in interspaced relation thereto.

To provide an improved drive mechanism for phonograph turntables whereby any or all of the foregoing objects may be achieved and which may be unitarily removably secured to a platform which rotatably supports a phonograph turntable either as original or replacement driving means for such turntable.

To provide an improved drive mechanism for phonograph turntables whereby any or all of the foregoing objects may be achieved and which comprises a speed selecting handle which is adapted for movement in a path which is of uniform directional nature throughout to a plurality of adjustment positions which are interspaced in said path.

To provide an improved drive mechanism for phonograph turntables whereby any or all of the foregoing objects may be achieved wherein the degree of pressure exerted between the peripheral pulley portions of serially related pairs of friction driving elements of the mechanism of which one thereof is the final drive friction wheel of the mechanism which is initially determined by the force exerted by yieldable spring means of the mechanism.

To provide an improved drive mechanism for phonograph turntable whereby any or all of the foregoing objects may be achieved wherein the degree of pressure exerted between the peripheral pulley portions of serially related pairs of friction driving elements of the mechanism of which one thereof is the final drive friction wheel of the mechanism which is initially determined by the force exerted by yieldable spring means of the mechanism and wherein during the driving of said turntable by said wheel the degree of such pressure engagement is variably increased according to the load imposed upon said wheel by the driven turntable.

Other objects of my invention and the invention itself will be apparent to those skilled in the art to which my invention appertains by reference to the following description of a preferred embodiment of my invention, which is illustrated in the accompanying drawings, wherein:

Fig. 1 illustrates the mechanism of my invention in plan view, a pendant flange portion of a turntable being shown with the idler wheel of the mechanism applied to the inner concave surface of said flange and the adjustment mechanism being shown in that position wherein the relationship between the driving pulleys and the idler wheel is such that a pulley driven through a belt by a motor shaft makes peripheral driving engagement with a rubber peripheral tread of said idler wheel.

Fig. 2 is a view similar to that of Fig. 1 but illustrating the parts of the mechanism as relatively disposed for effecting driving of said idler wheel as a result of peripheral engagement between said idler wheel and a pulley portion of the motor shaft which is of relatively larger diameter than a second pulley portion thereof.

Fig. 3 is a view substantially like those in Figs. 1 and 2 but showing the parts so disposed as to effect driving of said idler wheel as a result of peripheral frictional engagement between the rubber tread of said idler wheel and the second pulley portion of said motor shaft and which portion is of lesser diameter than the said portion which in Fig. 1 is shown in engagement with said idler wheel rim.

Figure 7:
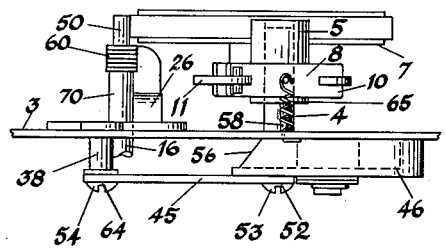
Fig. 7 is a side elevational view of certain portions of the mechanism of my invention, the view being taken as from a vertical plane such as that being indicated at 7—7 in Fig. 3.
Figure 18:
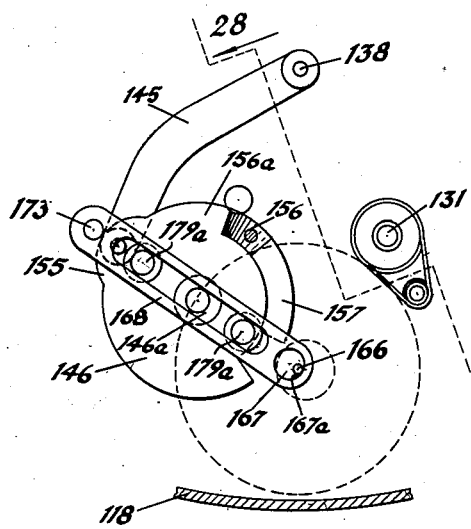
Figure 19:
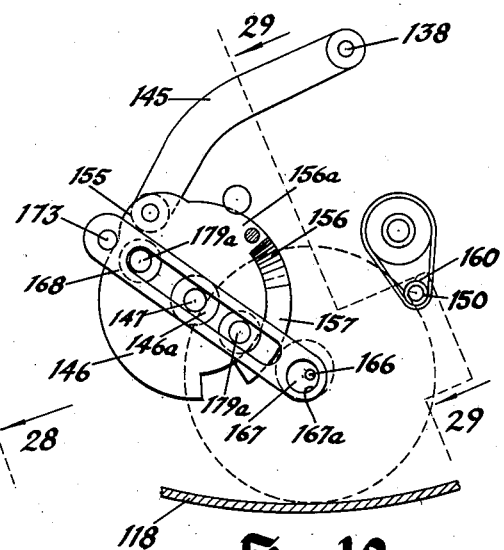
Figure 20:
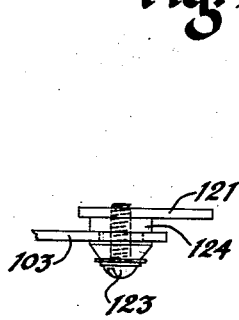
Figure 17:
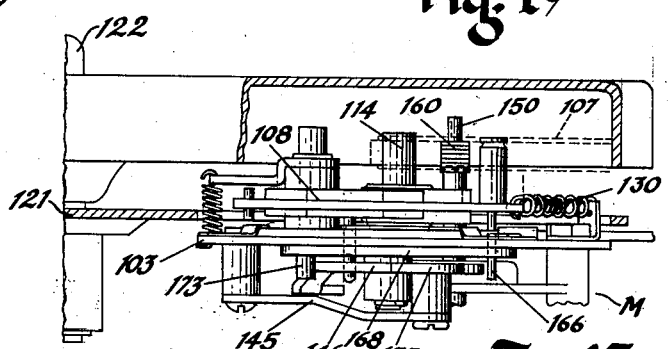
Fig. 17 is a side elevational view taken from a plane indicated by the line 17—17 of Fig. 15.
Figure 28:
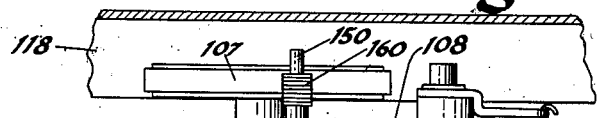
Figure 29:
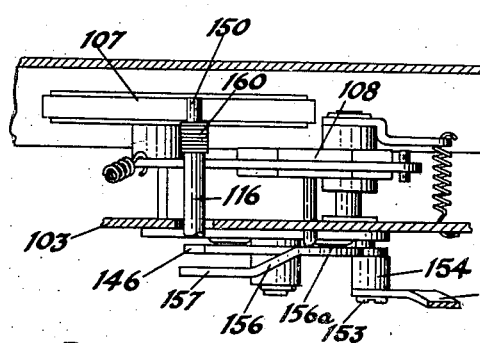

Figs. 18 and 19 respectively illustrate in plan view different adjustment positions imparted to the cam disc and other associated parts by disposing a manually operable hand lever in two different adjustment positions;

Fig. 20 is a side elevational view of a detail and relates to the structure of one of three rubber grommets employed for suspending the plate which supports the unitary mechanism of the said second embodiment from the turntable platform plate 121;

Fig. 21 illustrates in plan view the modified type of handle adjustment lever employed in said second embodiment;

Fig. 22 is a side elevational view of the lever of Fig. 21;

Fig. 23 shows a combination spring holder for the lever of Fig. 21 and detent spring therefor;

Fig. 24 is a side elevational view of the spring element of Fig. 23;

Fig. 25 is a vertical sectional view of a section of the mounting plate and of a motion communicating link together with a fragment of a pin projected through superposed apertures of the common mounting plate and said link and also the means employed for longitudinally slidably suspending said link from said plate;

Fig. 26 is a perspective view of a rotatable camming element for communicating adjustment movements from the lever of Fig. 21 to supporting means for the final drive wheel of the mechanism to adjust said wheel;

Fig 27 is a plan view of the cam element of Fig. 26;

Fig. 28 is a view taken from the direction of the arrows 28—28 of Fig. 18, but omitting a showing of certain of the parts and showing the remaining parts in such relatively disposed positions as is occasioned by the adjustment lever being in an intermediate stage of adjustment movement;

Fig. 29 is a view of the same general nature as that of Fig. 28 but showing the said remaining parts of Fig. 28 adjusted for effecting the same speed of drive as provided for in the showing of Fig. 7;

Referring now to all of the drawings in all of which like parts are designated by like reference characters, it is to be noted that the mechanism of my invention is provided with improved adjustment means whereby the final drive wheel is caused to engage its periphery with either a relatively upper pulley portion 50 of the motor shaft 16 which is of relatively least diameter and another pulley portion 60 of said shaft which is relatively lower and is of relatively greater diameter, to achieve driving of said wheel at two different speeds, as does the mechanism disclosed in the said prior Metzner patent, and additionally, being adapted to shift the said friction wheel 7 to a different lateral position to interchangeably effect engagement between its periphery and a cylindrical pulley portion of a second pulley which is driven by an encircling belt by another still lower portion of said motor drive shaft, as does the mechanism of the prior application of Herbert L. Hartman, Serial No. 22,348 filed April 21, 1948.

My improved mechanism involves improvements with respect to either or both of the aforesaid mechanisms of the said prior patent and pending application, and at the same time represents a functional advance over either thereof in that it affords selective driving of the idler wheel at any of three different peripheral speeds.

The wheel shown at 7 is positioned on a mount which comprises the wheel journal post 6, the slide element 11 on a web portion of which the post is secured and the slide carrier mount has a hub 5 being journalled on another post 4, the lower end of the post 4 being rigidly secured at its bottom end to a mounting plate 3 and the carrier mount 8 having laterally slotted wings 10 arranged at its four corners within the slots of which the arms of a carrier slide 11 are disposed, said slide being thus longitudinally shiftable with respect to the mount 8 and the mount 8 being rotatable about its post 4, whereby the wheel 7 whose journal post 6 is carried by said slide is freely movable in all lateral directions, a tensile helical spring 13 interposed between and secured to the slide 11 and a fixed element 39 yieldingly urges the said wheel outwardly from the carrier mount 8 and tends to swing said mount on its journal post 4, so that the periphery of the idler wheel 7 may be yieldably engaged with the driving pulley means which in this case is the upper pulley portion 14 of the pulley 40 or alternatively, either the upper pulley portion 50 or the lower pulley portion 60 of the motor shaft 16.

The spring 13 also resiliently urges another relatively arcuately interspaced rim portion of the idler wheel as indicated at 17 against such a concavely annular inwardly facing surface of a phonograph turntable element which is here shown as being the flange 18 of the turntable 19.

A supporting post 22, for the turntable 19, is journalled for rotation on said platform in accordance with well-known, established practice, and the usual machine screws 23 and rubber cushioning and non-sound conducting grommets 24 afford convenient means for detachably securing said plate 3 and the thereby carried mechnaism to a turntable supporting platform such as that at 21 for the purpose of effecting peripheral engagement between the rim of the final drive wheel 7 which thus operates as an idler wheel, and the pendant peripheral flange 18 of the turntable 19 which is fitted upon said post 22.

The electrical driving motor M is pendantly supported by the plate 3, by a plurality of bolts at 41, 43 and 62 with the motor shaft 16 loosely projected upwardly through coaxial apertures of the plate and of a relatively superposed speed selecting lever 26, the upper end portion of the shaft 16 being formed to provide an uppermost friction pulley portion of relatively small diameter, while the adjacent but lower portion of the shaft affords a second alternate friction pulley portion of substantially greater diameter.

Figure 12:
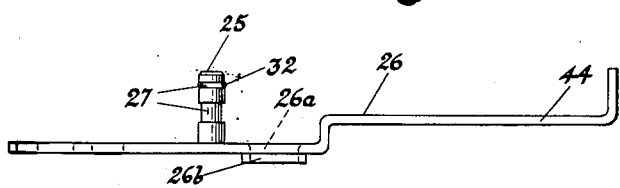
Figure 14:
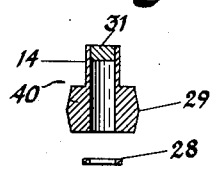
Fig. 14 shows a metallic pulley element and a felt washer employed therewith, both being shown in diametrical vertical sectional view.

The speed selecting lever 26 is apertured at 26a for passage of the motor shaft, the metal bordering the aperture being in the form of a downturned flange 26b, Fig. 12, said flange making a bearing fit in the said relatively coaxial aperture of the plate 3, and said lever 26 is thus adapted to swing about an axis 35 which coincides with the axis of the motor shaft 16, said shaft being of substantially smaller diameter than the diameter of the lever aperture 26a.

An upstanding post 25, having intermediately disposed successive interspaced annular grooves 27, the upper groove containing a split wire ring 32, is rigidly riveted at its lower end to the lever 26, and a felt lubricant absorbent washer 28 and a metallic pulley 40, having respectively upper cylindrical and lower crowned pulley portions 14 and 29, are successively telescoped over said post, the bore of the pulley being preferably closed at its upper end by a solder or other metallic plug 31. The upper end of the post 25, which makes bearing engagement with the plug 31, causes the lower end of the pulley to make but light engagement with the felt washer 28, and the split ring 32 makes sufficient frictional engagement with the wall of the pulley bore to cause the ring to rotate with the pulley 40, and to resist upward movement of the pulley element on the post 25.

The portion of the motor shaft 16, which projects above the level of the lever 26 has an uppermost, diametrically reduced upper end pulley portion 50, an intermediate next lower pulley portion 60, which is conveniently of larger diameter, and a lowermost belt pulley portion 70.

By virtue of the above construction, the lower and relatively larger crowned pulley portion 29 of the pulley element 40 is rotatable on said post 25 and its crowned portion 29 is disposed at the level of a portion 70 of the motor shaft 16 which is disposed adjacently below the aforesaid lower shaft pulley portion 60, whereby a rubber band 80 may be stretched and lowered over said shaft and pulley 40 and looped over said shaft portion 70 and the crowned pulley portion 29 of the pulley 40, said belt thus serving to communicate rotary motion from the motor shaft to said pulley element 40, for the ultimate purpose of rotating the upper cylindrical pulley portion 14 of said pulley 40.

The lever 26, whose swinging axis coincides with the axis of the motor shaft 16 carries the pulley 40 which thus may be shifted about the motor shaft axis, toward and away from the rubber rim of the idler wheel 7.

The lever 26, near its end which is disposed remotely beyond its swinging axis 35 from its manually actuated end 44, is provided with a transverse arcuate aperture 36 and beyond said aperture is provided with a relatively narrow extension 37, to which is pendantly affixed a motion communicating connecting pin 38, to reciprocate a horizontal link 45, to which it is pivotally connected, at 64, said link in turn, being pivotally connected by its other end, at 52, to a formed cam disc 46, which thus may be rotatively adjusted by motion transmitted by said link 45, from the end 37 of the lever 26, to said disc 46.

The lever 26 is held against the upper surface of the mounting plate 3 by a screw 41 and a leaf spring 42, the latter having an end clamped to the plate 3 by a screw 43, which additionally secures to said plate 3, the element 39 to which an end of the spring 13 is secured to said plate; the free end of said leaf spring 42 frictionally engages the upper surface of the lever 26 to restrain the portion of said lever which is adjacent to its axis from undesirable, manually effected, upward movement.

Figure 8:
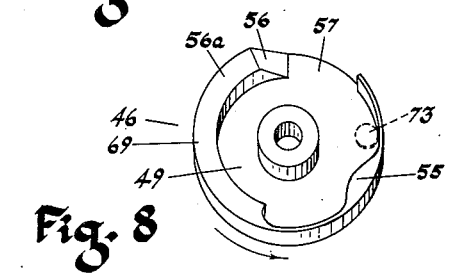
Fig. 8 is a perspective view of a flanged circular cam which is a part of the selective adjustment apparatus employed in my improved mechanism.
Figure 11:
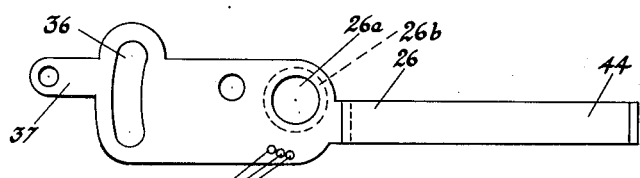
Figs. 11 and 12 are respectively top plan and side elevational views of a lever, the swinging of which accomplishes all selective speed adjustment operations.

The above mentioned disc-like cam element 46, most completely shown in Fig. 8, but well shown in association with other elements in Figs. 6, 7, 9, 10 and 13 and less completely in other figures of the drawings, comprises a lowermost circular flat surface 49 and is operatively mounted at the lower side of the mounting plate 3, said disc having a centrally disposed tubular hub portion 46a by which it is journalled for rotative swinging on a post 47, projected through its hub, which post is fixedly anchored by its upper end 48 in an aperture of said mounting plate.

When the lever 26 is adjustably swung, about the axis of the motor shaft 16, swinging motion is communicated from its end extension 37 through the pin 38, to an end of the link 45 which is pivotally secured at 52 to the flat underside of the cam disc 46 by a screw 53. A screw 54 pivotally joins the connecting pin 38 and the other end of the link 45.

The cam disc 46 is provided, at its upper side, with camming surfaces at 56, and at 57, that at 56 rising from a land 57 to a more elevated arcuately formed land 56a which is at the uppermost surface of an arcuate flange 69 which borders the edge of said disc.

A pin 58 which is secured at its upper end to the swingable idler wheel carrier 8 and extends downwardly through a substantially large arcuate aperture at 59 of the plate 3, engages, by its lower end, the cam surface 56, and when the disc is swung in either opposite direction to shift the point of engagement of said pin 58 from the one said land to the other said land, the cam causes said pin, and therefore the wheel carrier 8, and wheel 7 to be raised or lowered.

A spring 65, secured at its two ends to the carrier 8 and to the plate 3, resiliently tends to lower said carrier, so that when the cam is swung in such direction as to permit the pin 58 to be lowered, the spring is effective to ensure that the carrier descends.

Another function of the cam disc is to move the idler wheel 7 laterally out of peripheral engagement with either of the motor shaft pulley portions 50 or 60, when the idler wheel is to be shifted from peripheral engagement with one said portion, preliminary to its making peripheral engagement with the other such portion.

To achieve such momentary lateral movement of the wheel 7, a pin 66, secured to the lower end of the idler wheel journal post 6, extends downwardly therefrom into an aperture 67 of a slide element 68, which is slidingly guided in longitudinal movement on the plate 3 by a pin 79 rigidly anchored in said plate 3 at its lower end and having its shank loosely projected through a longitudinal slot 72 of said slide element, and its head surmounting the lateral portions of the element 68 which border said slot.

At the end of the slide 68 opposite to the end having the aperture 67, a cam follower roller element 73 is carried on a pin 74 whose upper headed end is rigidly secured to the slide end, and said pin 74 is projected downwardly through an enlarged aperture 75 of the plate 3 at a portion thereof which adapts said roller to be laterally engaged by the lateral cam projection 55 of the cam disc 46.

Figure 10:
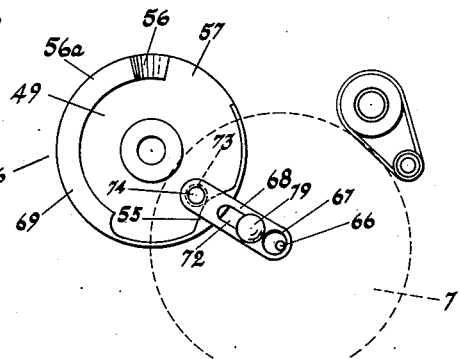
Fig. 10 is a plan view of certain elements of the adjustment apparatus for my improved drive mechanism, including the cam of Fig. 8 and also a link extending between an element of said cam and an element of the idler wheel mount for communicating lateral adjustment movements to said idler wheel whose periphery is indicated by a dotted line circle.
Figure 13:
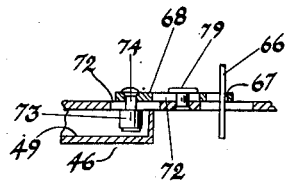
Fig. 13 is a vertical section taken longitudinally, medially through the motion-communicating link shown in Fig. 10, a fragmental portion of the circular cam and also of the mounting plate for the mechanism being also shown.

Figs. 10 and 13 show the above described structure involving the roller 73, slide 68 and pin 66 and by a dotted line circle in Fig. 8, one operative position of said roller 73 is shown with respect to the cam 55 of the disc 46.

It will be thus understood that when the disc 46 is swung in the counter clockwise direction indicated by the arrow in Fig. 8, that the lateral cam 55 will engage and laterally shift the roller 73, thus also the slide 68, the pin 66, and idler wheel journal post 6, and wheel 7 to disengage the wheel periphery from the pre-engaged motor shaft pulley portion, 50 or 60.

A consequent reversed rotational movement of the disc will similarly laterally shift said roller 73 and wheel 7 for the same purpose.

Figure 1:
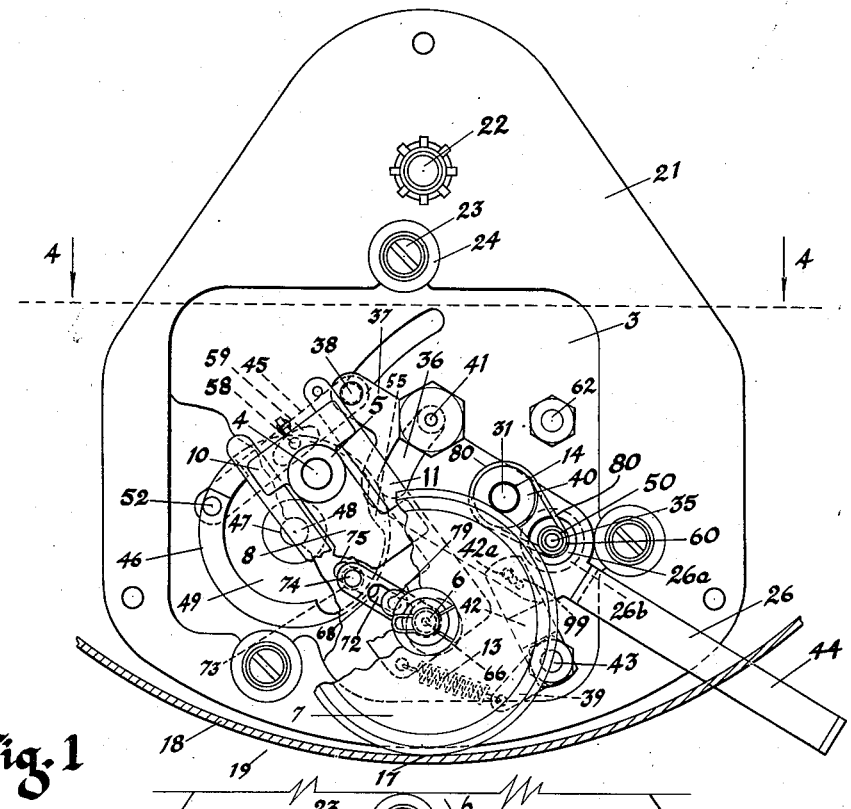
Figure 2:
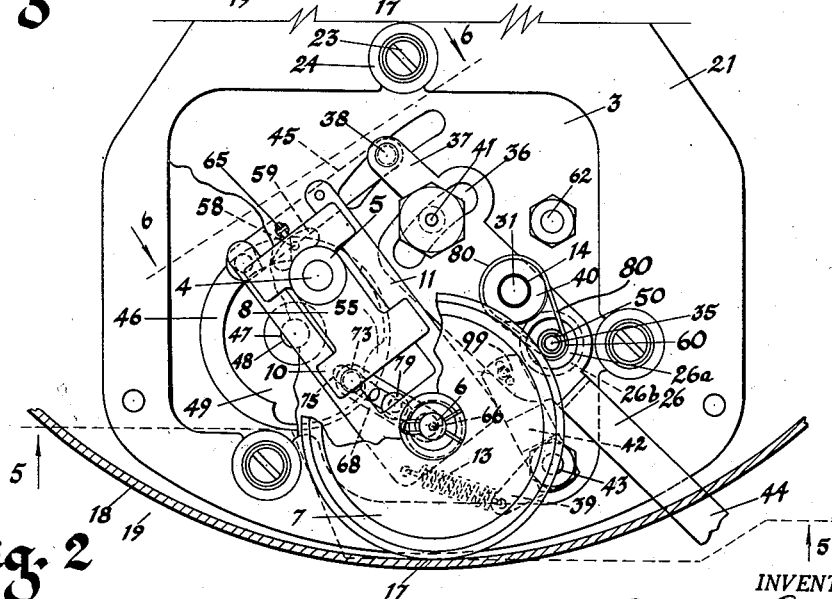
Figure 3:
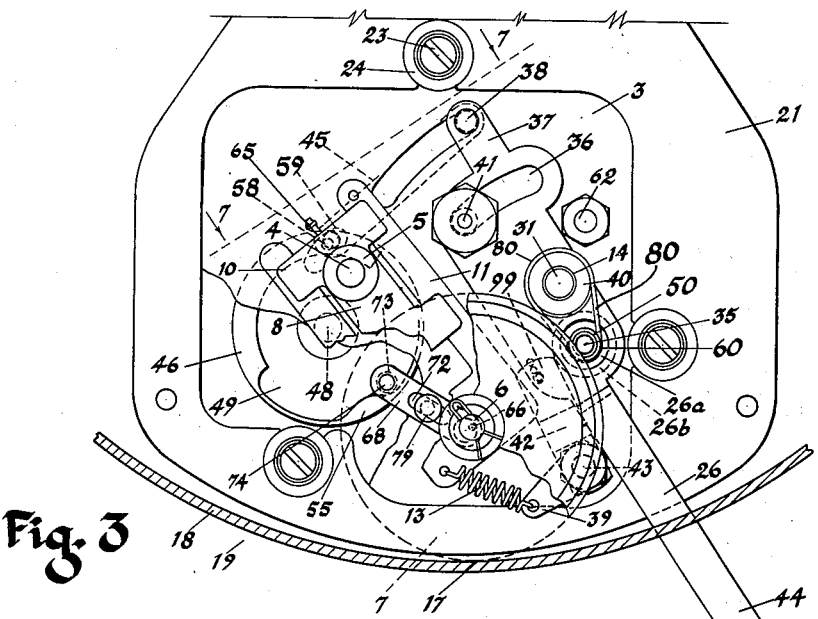

Having described the details of the speed shifting mechanism, its operation will be readily understood by reference to the drawings, and particularly to Figs. 1, 2 and 3 thereof which illustrate the three operative adjustment relative positions of the idler wheel, the pulley 14, and the two motor shaft pulley portions 50 and 60.

Figure 4:
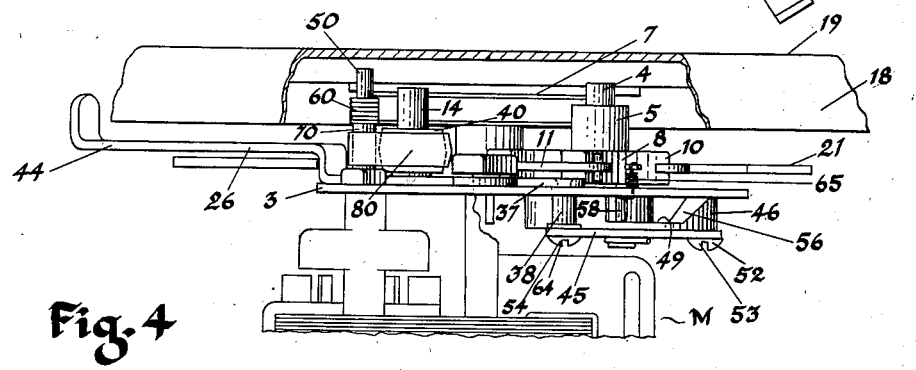
Fig. 4 is a vertical section taken on the line 4—4 of Fig. 1 showing the drive mechanism and a portion of the turntable and driving motor in side elevation, with certain parts shown as broken away to expose other parts therebeyond.
Figure 5:
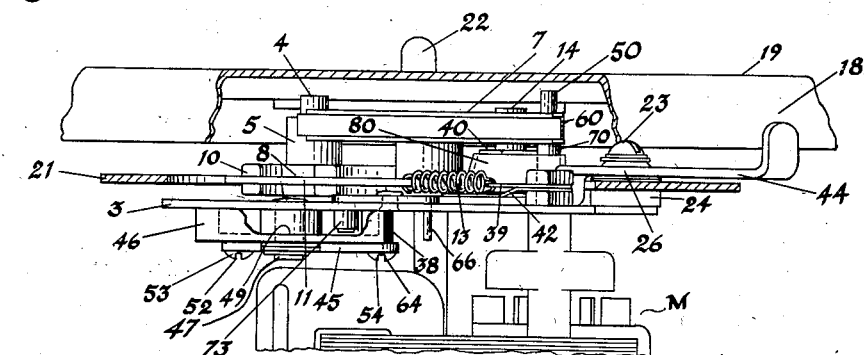
Fig. 5 is a view similar to that of Fig. 4 but taken on the line 5—5 of Fig. 2.
Figure 6:
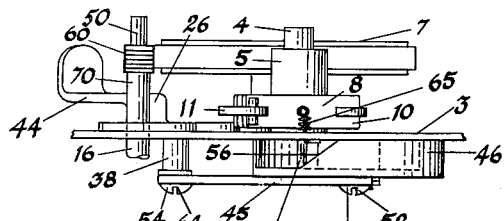
Fig. 6 is a side elevational view of portions of the mechanism of my invention, the view being taken on the line 6—6 of Fig. 2.
Figure 9:
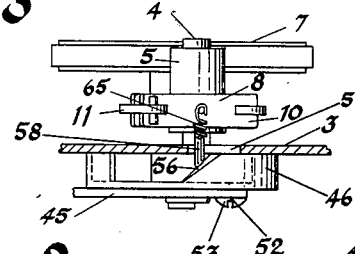
Fig. 9 is a side elevational view of the said cam of Fig. 8 as applied to the function of elevating or lowering the idler wheel carrier portion of my mechanism.

In Fig. 1 the idler wheel is peripherally engaged only with the belt driven cylindrical pulley 14; in Fig. 2 it is similarly only engaged with the shaft pulley portion 60; and in Fig. 3, such engagement is only had with the pulley portion 50. These three adjustment positions are also respectively shown in Figs. 4, 5 and 7, and again, Fig. 6 shows the above recited second position of Figs. 2 and 5 with the elevating pin 58 in lowermost position on the lower land 57, with the idler wheel therefor disposed at its lower of two levels and where the elevating pin is closely adjacent to the cam surface 56 which it engages when the cam disc is further rotated in the clockwise direction of Fig. 8 or toward the left as in Figs. 6 and 9, Fig. 9 showing the pin 58 and the wheel 7 being elevated, while the lateral cam 55 is momentarily shifting the wheel 7 laterally out of peripheral engagement with the shaft pulley portion 60.

The relatively angularly different positions of the lever 26 of Figs. 1, 2 and 3 are progressively relatively more clockwise advanced, and represent the manually effected settings of the lever to achieve driving of the idler wheel at three different peripheral speeds which may, if desired, be such as to drive a turntable respectively at 45 R. P. M., 78 R. P. M. and 33½ R. P. M.

While driving of the idler wheel by the pulley 14, or by the shaft pulley portion 60 is achieved with the idler wheel disposed at the same lower level, the change of engagement of the periphery of said wheel by said pulley 14 instead of the shaft pulley portion 60 is effected by a further counter-clockwise movement of the lever from the position of Fig. 2 to that of Fig. 1, whereby the pulley 14 which is carried on the lever 26, is rotatively advanced to engage the periphery of the wheel 7 and to push it away from the pre-engaged shaft portion 60; in such a case the wheel 7 is pushed along the turntable flange 18 and said wheel makes a lateral rolling movement in a clockwise direction upon, and while guided by, said flange.

From the foregoing it will be understood that a reverse adjustment movement of the lever to move the pulley 14 in a clockwise direction about the lever axis 16 will disengage said pulley from said wheel periphery and the spring 13 will restore the wheel periphery to engagement with the shaft pulley portion 60.

Further clockwise movement of the lever to the position of that in Fig. 3 will first cause the cam 55 to effect the described lateral displacement of the idler wheel to disengage its periphery from the shaft pulley portion 60, whereupon the cam 56 will elevate the pin 58 and the wheel 7 to the level of the uppermost shaft pulley portion 50 after which the cam 55 will release the roller 73 from engagement therewith, and lateral movement of the wheel 7, by the effect of the spring 13, will cause the wheel periphery to engage the uppermost pulley portion 50 shown in Fig. 3.

Then, moving the lever in the counter-clockwise direction first causes the cam 55 to laterally disengage the wheel from the shaft pulley portion 50, then the pin 58 descends the cam surface 56 by virtue of tensile pull of the spring 65, and the wheel periphery is re-engaged with the pulley 14 as shown in Fig. 2.

Further counter-clockwise lever movement then removes the pulley 14 from engagement with the wheel 7, to permit the spring 13 to further move the wheel 7 inward to engage its periphery with the shaft pulley portion 60, as in Fig. 1.

The above three adjustment positions of the lever 26 are, preferably, yieldably maintained by the effect of a bead projection on the free end of the leaf spring 42 bearing against the upper surface of the lever 26, where three interspaced indentures of said lever surface are adapted to successively receive said bead projection.

All of the operative parts of the above described mechanism are unitarily carried by the plate 3, which plate 3 is adapted by means of mounting screws 23 and rubber sound insulating grommets 24 to be attached to a supporting plate such as 21 for a turntable post 22 which in turn is adapted to support a turntable 19. Thus the unitary mechanism of my invention is adapted to be removably attached to such a plate 21 for the driving of the turntable rotatably supported by said plate by engagement of the final drive wheel 7 of the mechanism with the inner lateral surface of the annular turntable flange 18, the wheel 7 having a rubber sound insulating rim which engages the metallic flange 18 and said rim is also adapted for selective engagement with the metallic surface of the pulleys 14, 50 or 60, whereby no mechanism noises may be communicated to the turntable from the motor or any part of the mechanism.

I consider it also important that selective adjustment of the lever 44 to drive the wheel 7 at any of three different speeds is achieved by moving the handle lever 44 in a path of movement which is of the same directional nature throughout, and being here shown as of arcuate form instead of moving a handle in steps of movement, each step requiring movement in successive different directions as has been previously proposed.

My improved mechanism is also designed so that the pressure engagement between the rubber rim of the final drive wheel 7 with the turntable flange 18, and also at different times with the pulleys 14, 50 and 60, is achieved solely by the spring means, herein shown as a helical spring 13, such pressure engagement tending to roll the wheel 7 between any operatively adjusted one of said pulleys and said turntable flange 18, but of course, as the drawings show, the distance between the engaged surfaces of any of said pulleys and the inner surface of said flange is insufficient to permit said wheel to pass between any of said pulleys and said flange.

The pressure engagement afforded by said spring 13 as aforesaid, is also preferably increased by the cooperative effect of the driving torque imposed upon said turntable flange by said wheel, since the direction of rotation of said turntable and said wheel being clockwise, said wheel 7 tends to roll on said flange 18, but being prevented from doing so, drives the turntable and the loading of said wheel by the turntable results only in pressure resulting from the reactive effect of the driving torque exerted upon said wheel which increases the degree of pressure contact between said wheel and said flange and operatively positioned pulley over that pressure which would result from the use of the spring alone.

I consider it highly important that the pressure contact between said wheel and the elements driven by and driving said wheel should be maintained at a relatively low value of pressure consistent with the load imposed upon said wheel by the turntable.

Referring now to the figures of drawing, 15 to 29, which illustrate a second embodiment of my invention and in which parts having functions similar to the functions of corresponding parts shown in Figs. 1 to 14 inclusive are indicated by reference numerals which are one hundred numbers higher than those employed to designate the previously described parts of the said first embodiment. In the second embodiment a sheet metal stamped disc 146 is substituted for the cast or machine disc 46, and affords an exterior cam surface projection 155 shown best in Figs. 26 and 27.

The somewhat differently formed manually operable lever 126 is pivotally secured to and disposed at the upper side of the main plate 103, and is provided with a relatively wider slot 136, Fig. 21, and affords a set of four widely interspaced apertures 199a, 199b, 199c and 199d which locate four different relatively interspaced stations of rest for all parts of said lever which stations are located in a path of uniformly like directional nature throughout, and in the embodiments shown the handle moves in an arcuate path about the point 135 which corresponds to the swinging axis of the lever 126, to afford four different adjustment positions for the wheel 107 whereas in the first embodiment three adjustment positions, only, are provided. The aforesaid apertures, at 199, are relatively more interspaced, than are the indentures 99 of the first embodiment, being located a greater distance from the swinging axis 135 of the lever 126. A resilient detent spring 142 an arm of which having a downward detent projection 142a is adapted to be interchangeably received within upper portions of the apertures, is provided to yieldably restrain movement of the hand lever 126 from one to any other adjustment position; another arm 142b of said spring 142, presses against the upper surface of the lever 126, both of said arms thus exerting downwardly directed pressure on the two end portions of the lever to oppose any tendency of the lever to be vertically displaced when in use.

The additional adjustment position which is provided in the second embodiment, is one wherein the rim of the idler wheel 107 is not peripherally engaged with any of the pulley surfaces, and is selected by swingably disposing the handle 144 of the lever 126 to that adjustment station, wherein the detent projection 142a enters the upper portion of the aperture 199b.

Therefore by virtue of the above described selective adjustment of said lever 126 to cause the detent 142a to register with the aperture 199b, no pressure contact by the motor shaft pulleys 160 or 150, or by the idler pulley surface 114, with the rim of the wheel 107 is had, and such adjustment position being effected, prior to periods of non-use of the apparatus, the rubber material of said rim, when immovable, will not be exposed to the indenturing effect of any such stationary pulley surface.

The rotatable cam 146 of Figs. 26 and 27 is in the form of a stamping carried on a vertical extending hub 146a which in turn is journalled on a journal pin 147 which is carried by the frame plate 103 and while generally in the shape of a disc, the cam element 146 is cut away to provide a tongue which affords a lowermost land surface 157 and an inclined cam surface 156, the upper surface of the uncut disc portion providing an uppermost land surface 156a.

The cam 146 is oppositely swung by virtue of swinging movements communicated from a rear portion 137 of the hand lever 126 to the disc 146 by a link 145 which is pivotally secured by a pin 138 to the portion 137 of the hand lever and whose other end is pivotally secured to the underside of the lateral projection 155 of the sheet metal disc 146 by a machine screw 153, the point of connection being conveniently lowered by the use of a spacer 154.

Lateral shifting of the idler wheel from a lateral position wherein the wheel 107 is in peripheral engagement with one of the two pulley surfaces 150 or 160 of the motor shaft 116 or alternatively with the pulley surface 114 of the stepped pulley 131, is achieved in a manner similar to that in the first embodiment, by the provision of a slide 168 which is pendantly and slidably supported in the underside of the main plate 103, and having a downwardly projecting cam follower 173 at one end and being apertured at 167 at its other end whereby a pendant pin 166 is secured, by its upper end, to the lower end of the post 106 upon which the idler wheel 107 is journalled.

The cam follower 173 is laterally engageably with the outwardly extending cam projection 155 of the cam disc 146, whereby spring pressure being applied to the slide 168 by the spring 130, and therefor to the pin 166, the cam follower projection 173 will be engaged with the peripheral edge surface of the cam 155 whenever the cam disc 146 is rotated to the proper position by movement of the handle 144 of the lever 126 to rotate said cam projection 155 toward, into and out of lateral engagement with said cam follower.

The slide 168 is pendantly supported from the main plate 103 by virtue of the shank portions of a pair of interspaced elements 179, each riveted, as at 179a, to the plate 103 and being projected through a longitudinal slot 172 of the slide 168 and by the enlarged lowermost heads 179b of the elements 179 being wider than the width of the slots to loosely support the slide, the slide being provided with an enlarged aperture 167, within which the pin 166 is passed.

Movement of the slide 168 is so related to swinging movements of the lever 126, and to the resultant swingable rotary movements of the cam element 146, that whenever the hand lever is in the "off" position with the detent 142a disposed within the aperture 199b, the lateral cam projection 155 has exerted an outward thrust on the cam-follower element 173 of the slide 168, to cause the relatively remote inner edge portion 167a of the slide aperture 167, to exert a laterally directed effort on the pin 166, whereby said pin 166 with the wheel rim is disengaged as shown in Fig. 28, from the motor shaft pulley portions 150 or 160 with whichever it had precedently been engaged, and from a turntable flange such as here shown at 118.

Since other co-related movements of the idler wheel 107 and adjustment lever 126 are effected in the manner previously described, and by parts whose counter-parts are herein co-relatedly numbered, the description of the operation of said counter-parts to effect such adjustment movements will not be here repeated.

Figure 15:
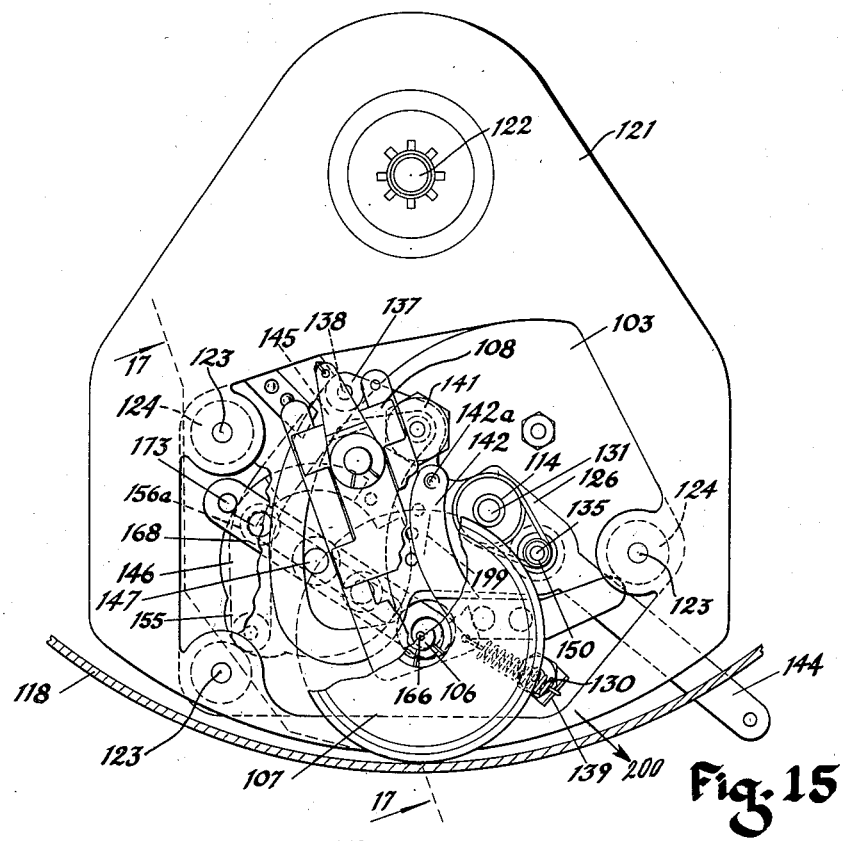
Fig. 15 is a top plan view of the nature of that of Fig. 1 but illustrating a second embodiment of my invention and with the parts adjusted similarly.
Figure 16:
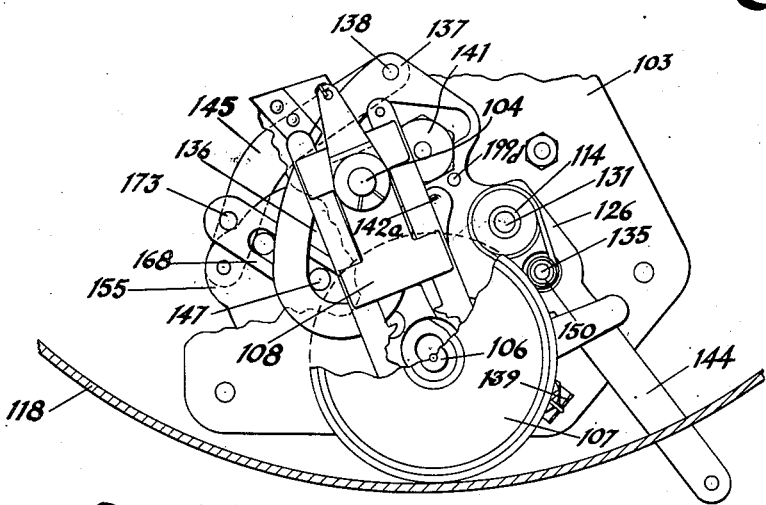
Fig. 16 is a plan view of the said second embodiment with the speed adjustment mechanism disposed in a manner similar to that of Fig. 2.

With respect to both said embodiments it will be readily understood that the engagement of the wheel rim with a turntable flange such as that at 18 or 118, effects a restraining influence upon said wheel and exercises a guiding influence upon the wheel 107, to more efficiently ensure engagement of the wheel rim with any one of said pulley portions 150, 160, or 114, of said second embodiment and the corresponding pulley portions 50, 60, or 14 of said first embodiment, this being a result of directing the pull exercised by the spring 13 or 130 in the direction shown by the arrow 200 in Fig. 15.

In both embodiments shown and described herein the relative angularity of disposition of a first portion of the rim of the wheel 7 and 107, which laterally engages the flange 18 with respect to the second portion of said wheel rim which are laterally engageable with the idler pulley 4, and 104, and with respect to the third rim portion engageably with the shaft pulley portions is such that said first and second rim portions are separated by approximately 150 degrees and said first and third rim portions are separated by approximately 130 degrees.

The direction of pull of the wheel 7 or 107 by the spring 13 or 130 is such as will tend to roll said wheel between the rim-engaged portion of the turntable flange 18 and either and both of said shaft and idler pulley, but of course, after the wheel rim becomes engaged with either said shaft, or idler pulley, pulley portions, no further rolling movement in response to the pull of said spring is effected.

Having thus described my invention as applied to two embodiment mechanisms, I am aware that numerous and extensive departures may be made from the means herein shown, but within the purview of the principles employed herein.

I claim:

1. A selective three-speed frictional drive transmission mechanism adapted for application to a cylindrically annular flange portion of a phonograph turntable to frictionally drive the same comprising in combination with an electric motor, an upwardly directed drive shaft thereof, a mounting plate from which said motor is suspended, said shaft having an end portion projected upwardly above said plate, said end portion having three pulley portions comprising an intermediate pulley portion of greater diameter than a pulley portion disposed thereabove, and a third pulley portion disposed therebelow, a manually operable adjustment element which is selectively movable to at least three successively disposed adjustment positions being carried by said mounting plate, a supplemental pulley journalled to rotate on an axis parallel to that of said shaft on a movable portion of said adjustment element and having a relatively lower pulley portion disposed at the level of, and laterally interspaced from, said third pulley portion of said shaft, and having a relatively upper pulley portion disposed above its said lower portion, a drive belt encompassing said shaft third portion and said lower pulley portion of said supplemental pulley adapted to transmit rotary motion from said shaft to said supplemental pulley, an idler wheel journalled for rotation on an axis parallel to that of said shaft and adapted to be adjustably moved upwardly and downwardly, and being laterally shiftable in all lateral directions, spring means resiliently constraining said wheel in a direction toward said shaft, and means deriving adjustment movement from said adjustment element when moving from one extreme position to the opposite extreme position to be adapted to sequentially move said wheel laterally away from peripheral engagement with a preengaged one of the upper pair of pulley portions of said shaft then to move said wheel to the level of the other pulley portion of said pair, and said adjustment element when disposed at an intermediate adjustment position adapted to thrust the periphery of the upper pulley portion of said supplemental pulley against the periphery of said wheel to so move said wheel laterally against the power of said spring as to disengage said wheel periphery from said lower pulley portion of the aforesaid pair and to frictionally drive said wheel by power communicated to the supplemental pulley by said belt.

2. A plural-speed frictional drive mechanism for phonograph turntables of the type having an annular peripheral pendant flange, comprising a drive wheel having a rim of rubber or equivalent friction and non-sound-conducting material, said wheel rotatable on a vertical axis, a mount for said wheel adapted for universal, horizontal self-adjusting movements and also adapted for adjusted movements to any of a pair of different vertical adjustment positions, an idler pulley element and a mount therefor, said idler pulley mount adapted for movement to relatively different laterally disposed adjustment positions, a motor and an upwardly extending shaft element therefor, said elements and said wheel being separately journalled for rotation on vertical axes and said elements each having a plurality of pulley surface portions disposed at relatively different levels, an endless belt looped over and resiliently maintained in engagement with the lowermost said pulley portion of both of said elements, said lowermost portions being disposed at a common level, a manually adjustable controller member movable in a path of uniform directional nature, from a first, to a second, and then to a third position of rest, and motion transmission means adapted, in response to movement of said member, to dispose said wheel in any of its said three different adjustment positions relative to said shaft and idler pulley portions, to interchangeably dispose said wheel in peripheral engagement with a pulley portion of a first of said elements, a pulley portion of the other of said elements which is at the same level and a third pulley portion of one of said elements which is at a relatively different level.

3. A plural-speed friction drive mechanism for phonograph turntables of the type wherein a final drive wheel of the mechanism is adapted to be peripherally engaged with a lateral annular surface of a phonograph turntable flange for driving the turntable, comprising an apertured mounting plate, a motor pendantly supported by the plate having a shaft projected upwardly through a plate aperture and provided with three successive pulley portions disposed above said plate, the uppermost shaft pulley portion being of least diameter, an adjustment lever journalled for horizontal swinging movement on said plate, said lever having a manually swingable handle portion, said handle adapted to be swung in opposite directions in a path of uniformly like nature throughout, a rotatable idler pulley journalled on a movable portion of said lever and having lower and upper pulley portions respectively disposed at the levels of the lowermost and intermediate of said shaft pulley portions, a friction drive wheel and a laterally and vertically movable supporting mount therefor carried by the plate, said wheel and said idler pulley being rotatable on axes parallel to the shaft axis, motion communicating means operable by said lever, when its said handle is swung in respectively opposite directions through a substantially restricted range of station-to-station movement in its said path to one or another of the stations thereof, adapted to effect respectively oppositely directed vertical adjustment movements to said wheel mount to respectively elevate or lower the wheel rim to the level of said uppermost shaft pulley portion or to the alternate common level of said upper idler pulley portion and said intermediate shaft pulley portion, said plate adapted to be so interfitted with a platform for a pendantly flanged turntable as to dispose a portion of the rim of said wheel for engagement with a lateral annular surface of the turntable flange, spring means exerting laterally directed pressure upon said wheel mount to effect engagement of one of a pair of interspaced portions of said wheel rim with that one of the two uppermost pulley portions of said shaft at whose level said wheel is then disposed, and to effect engagement by the other of said pair of interspaced portions of its periphery with a lateral surface of the turntable flange, and said motion communicating means comprising a member adapted, in response to a movement of said lever handle to a third station of its said path of movement to effect engagement of a portion of the wheel rim with the upper pulley portion of said idler pulley portion of said idler pulley while effecting disengagement of the said wheel rim from any intermediate shaft pulley portions pre-engaged thereby.

4. In a selectively plural speed unitary frictional drive mechanism for phonograph turntables of the type having a pendant annular flange, comprising a frame, a motor supported by the frame and having an upwardly extending vertical shaft whose upper end, disposed above the frame, comprises three axially aligned respectively upper, intermediate, and lower pulley portions of which the upper portion is of less diameter than the intermediate portion, an idler pulley disposed parallel to and laterally of said shaft and having upper and lower pulley portions respectively disposed at the levels of said intermediate and lower shaft pulley portions, said lower idler pulley portion being of greater diameter than said lower shaft portion, a drive belt encompassing the lower pulley portions of of said shaft and idler pulley, a vertically and laterally adjustable final drive wheel having a friction rim movable to the respective levels of either of the upper pair of shaft pulley portions, spring means applying laterally directed biasing pressure to cause said wheel rim to laterally engage that one of said uppermost pair of shaft pulley portions to whose level said rim has precedently been adjusted, manually operable motion transmission means comprising a manually movable handle adapted to be moved from any one to any other of a plurality of stations successively disposed in a path of like directional nature throughout, adapted, when said handle is moved in one direction from a certain one of said stations to another one of said stations in said path, to move said wheel rim from a first to a second of the two levels of said upper pair of shaft portions, and to restore the original level of said rim upon reverse movement between said stations, said transmission means comprising means adapted to laterally shift said rim away from said shaft portion, in opposition to the effect of said spring means, prior to and during an adjustment movement of the wheel rim from the level of said upper shaft portion to the level of said intermediate shaft portion and to release said wheel at a concluding portion of any such adjustment movement to permit said spring means to move said wheel in the opposite lateral direction whereby the wheel rim is engaged with said intermediate shaft pulley portion, and said transmission means comprising means adapted in response to movement of said adjustment element to a third station in the said path to laterally move said idler pulley laterally to engage, by its pulley portion which is disposed at the level of said shaft intermediate pulley portion, the said wheel rim and to force said wheel laterally to separate said rim from the pre-engaged intermediate shaft pulley portion, whereby said belt and idler pulley is interposed in the line of drive, between said shaft and said wheel, said frame also supporting said idler pulley, wheel, and adjustment means, and adapted to be interfitted with a turntable-supporting platform so as to peripherally engage the said wheel rim with the pendant flange of the turntable to frictionally drive the same.

5. In a selective plural-speed unitary frictional drive mechanism for phonograph turntables of the type having a pendant annular flange comprising a frame, a motor supported thereby and comprising an upstanding shaft, said shaft having an upper end affording a multiple pulley driving element, an idler pulley element rotatable on an axis parallel to that of said shaft and disposed laterally adjacent thereto, both said driving and idler pulley elements having a first lowermost pulley portion disposed at a common first level, also a second pulley portion disposed at a common intermediate level, and at least one of said elements having an uppermost pulley portion at a third level, any said uppermost pulley portion at said third level being of less diameter than the pulley portion of the same element which is disposed at said intermediate level, a vertically and laterally movable mount caried by the frame, a final drive wheel supported by the mount, said wheel adapted, by removably securing said frame to a phonograph turntable platform to be so disposed as to laterally peripherally engage the annular truntable flange thereof, spring means yieldably urging said mount in such a lateral direction as to effect peripheral engagement of the wheel rim with said flange and concurrently with a pre-selected one of those pulley portions of said elements which are disposed at either said second or third levels, manually operable adjustment means comprising a motivating handle, said handle adapted for station-to-station sequential movement in a path of motion of uniform directional nature throughout, and said adjustment means adapted, responsive to a complete movement in either opposite direction to move said mount sequentially to different positions to sequentially selectively position said wheel rim for sequential engagement with each of the pulley portions of said pairs of elements which are disposed at either of said second or third levels.

6. The drive mechanism substantially as set for in claim 5, characterized by said adjustment means comprising a member adapted to be moved in response to a preliminary portion of a station-to-station adjustment movement of said handle from one said station in its path of movement toward a next succeeding station, and adapted by such movement to effect movement of said mount in such a direction to laterally withdraw said wheel rim from spring-pressed pre-engagement with a third-level pulley position of one of said elements as a result of overpowering the opposing effect of said spring, said member adapted to maintain such lateral withdrawal of said rim during a next succeeding portion of said handle movement against the opposing effort of said spring means, and to release said mount for lateral movement in the opposite direction to effect engagement of the wheel rim with the second level pulley portion of the same element, by the retractive effect of said spring.

7. A selective plural-speed friction drive mechanism for turntables of the type having a pendant annular flange, comprising a supporting plate, a motor pendantly supported by the plate, a final drive wheel having a friction rim, a wheel mount having a vertically and laterally movable portion, said mount carrying said wheel at the upper side of said plate and affording a journal upon which said wheel may rotate about a vertical axis, a vertical shaft for said motor having three axially aligned pulley portions of which the uppermost of said portions is of lesser diameter than the intermediate pulley portion thereof, a laterally shiftable idler pulley having a pair of axially aligned pulley portions which are respectively horizontally aligned with the lowermost and intermediate of said shaft pulley portions, a drive belt encompassing the lowermost pulley portions of said shaft and idler pulley, said shaft and idler pulley being disposed in side-by-side relationship each being located adjacent to the said side of the wheel rim, said plate being adapted to be so secured to a phonograph turntable-supporting platform as to adapt the rim of said wheel for peripheral engagement with the pendant turntable flange, a spring exerting a resiliently applied force which is directed from the axial portion of the wheel towards the space between the said motor shaft and the wheel-engageable portion of the turntable flange, said spring adapted to tend to effect concurrent engagement of a pair of circumferentially interspaced portions at the same side of the wheel rim, respectively with, a lateral face of said flange and a lateral surface of that one of the two uppermost shaft pulley portions at whose level said rim may at the time be disposed, manually operable adjustment means adapted to interchangeably adjust the wheel rim to the level of one or the other of said upper pair of shaft pulley portions and also comprising means adapted when said wheel rim is in spring-pressed engagement with said intermediate shaft pulley portion to effect lateral movement of said idler pulley in such a direction as to cause it to engage the rim of said wheel and to laterally move said wheel with its mount, and in opposition to the pressure imposed upon said mount by said spring, in such direction as to effect disengagement of said wheel rim with said intermediate shaft pulley portion, and said adjustment means comprising an element adapted to shift said wheel laterally precedent to, and during any adjustment movement of said wheel wherein its rim is vertically moved from the level of the pre-engaged uppermost shaft pulley portion to the level of the said intermediate shaft pulley portion.

8. A plural-speed frictional drive mechanism for phonograph turntables of the type having an annular peripherally pendant flange, comprising a drive wheel adapted for peripheral frictional engagement with said flange, and having a rim of rubber or equivalent friction and non-sound-conduction material, said wheel rotatable on a vertical axis, a mount for said wheel adapted for universal horizontal movements and also adapted for adjusted movements to any of a pair of different vertical adjustment positions, an idler pulley element and a mount therefor, said idler pulley mount adapted for movement to relatively different laterally disposed adjustment positions, a motor and an upwardly extending shaft element therefor, said elements and said wheel being separately journalled for rotation on relatively interspaced vertical axes and said elements each having a plurality of pulley surface portions disposed at relatively different levels, an endless belt looped over and resiliently maintained in engagement with a first pair of said pulley portions which are respectively disposed on different of said elements and at a common first level, a manually adjustable controller having an operating handle movable in a path of continuously uniform nature throughout from any of three adjustment positions of rest to any other position of rest in said path, motion transmission means associated with said controller and said wheel, said elements each having a second pulley portion disposed at a second level, and one of said elements having a pulley portion of relatively least diameter disposed at a third level, spring means adapted to continuously exert a resilient effort upon said wheel mount and wheel, with said effort being so directed as to tend to establish and to maintain said wheel rim in peripheral spring pressed engagement with the periphery of any of said pulley portions to the level of which, and adjacent to which, said wheel rim is presented by said transmission means, said transmission means and said spring means adapted, in response to movement of said handle to different of its said three different adjustment positions of rest, to co-operatively interchangeably effect peripheral engagement between said wheel rim and the respective pulley portions of said elements which are disposed at the said second level, or that said pulley portion of one of said elements which is disposed at said third level, according to the adjustment positioning of said handle at a particular one of said three adjustment positions of rest.

9. The drive mechanism for phonograph turntables substantially as set forth in claim 2 characterized by said motion transmission means comprising laterally deflecting means adapted in response to an initial portion only of an adjustment movement of said handle from one said position of rest towards another said position of rest whereby said wheel rim is adapted to be moved by said transmission means from one of said levels to another level, adapted to laterally separate said wheel rim from a pre-engaged pulley portion of one of said elements in opposition to the said effort exerted on said wheel by said spring on said wheel, and said laterally deflecting means adapted to be disabled, in response to the concluding portion of any said selective adjustment movement of said transmission means, whereby said wheel rim is disposed at said different level of a different pulley portion of the same element, and to adapt said spring to then effect spring pressed peripheral engagement between said wheel rim and the selected pulley portion at said different level.

10. The drive mechanism substantially as set forth in claim 2, characterized by the provision of means affording a fourth position of rest for said controller handle, and by adapting the said ancillary transmission means in response to positioning said handle at said fourth position of rest, to maintain the rim of said wheel in laterally separated relation to a pulley portion of that one of said elements which is disposed at the level of said wheel rim.

11. A selective three-speed frictional drive transmission mechanism adapted for application to a cylindrically annular flange portion of a phonograph turntable, to frictionally drive the same, comprising in combination with an electric motor and an upwardly directed drive shaft thereof, a mounting plate from which said motor is suspended, said shaft having an end portion projected upwardly above said plate and said end portion having an intermediate pulley portion of greater diameter than an uppermost pulley portion disposed thereabove, and a lowermost third pulley portion, a manually operable adjustment element carried by the plate, which is selectively movable in a path of substantially like directional nature throughout, to at least three successively disposed adjustment positions of rest located in interspaced relation on said path, means adapted to yieldably retain said element at any said rest positions, a supplemental pulley journalled to rotate on an axis parallel to that of said shaft, being carried on a movable portion of said adjustment element and having a relatively lower pulley portion disposed in laterally interspaced relation to, and at the level of said third shaft pulley portion and having an upper pulley portion, friction drive means adapted to communicate rotary motion from said shaft third portion to said lower pulley portion of said supplemental pulley, a friction wheel carried by said plate, and journalled for rotation on an axis parallel to that of said shaft and adapted to be adjustably moved upwardly, downwardly, laterally in response to movements of said adjustment element in said path of movement, spring means resiliently constraining said wheel in the general direction of said shaft and supplemental pulley, and means deriving adjustment movement from said adjustment element, when moved from one extreme position to the opposite extreme position adapted to sequentially move said wheel laterally away from peripheral engagement with a pre-engaged one of the upper pair of pulley portions of said shaft then to move said wheel to the level of the other pulley portion of said pair, and said adjustment element when moving from a laterally disposed one of its said adjustment positions to another of its said adjustment positions, adapted to so laterally move said supplemental pulley as to engage and thrust the periphery of the upper pulley portion of said supplemental pulley against the periphery of said wheel to such an extent as to cause said wheel to be moved sufficiently laterally against the power of said spring to effect disengagement of said wheel periphery from said intermediate shaft pulley portion, whereby said wheel is frictionally driven by said supplemental pulley, said supplemental pulley, in turn, being frictionally driven by said shaft, and means adapting said mechanism to be associated with a turntable by so interfitting said plate with a turntable-supporting platform that a peripheral portion of said wheel may be frictionally engaged with an annular part of the turntable to drive the same.

SIDNEY E. CAPELL.

REFERENCES CITED

The following references are of record in the file of this patent:

UNITED STATES PATENTS

| Number | Name | Date |
|---|---|---|
| 1,049,883 | Lord | Jan. 7, 1913 |
| 1,591,494 | Lanchester | July 6, 1926 |
| 2,130,931 | Rysick | Sept. 20, 1938 |
| 2,438,265 | Metzner | Mar. 23, 1948 |